8060X
F. Fredly.
Mill Spindle.
Patented Mar. 10, 1834.
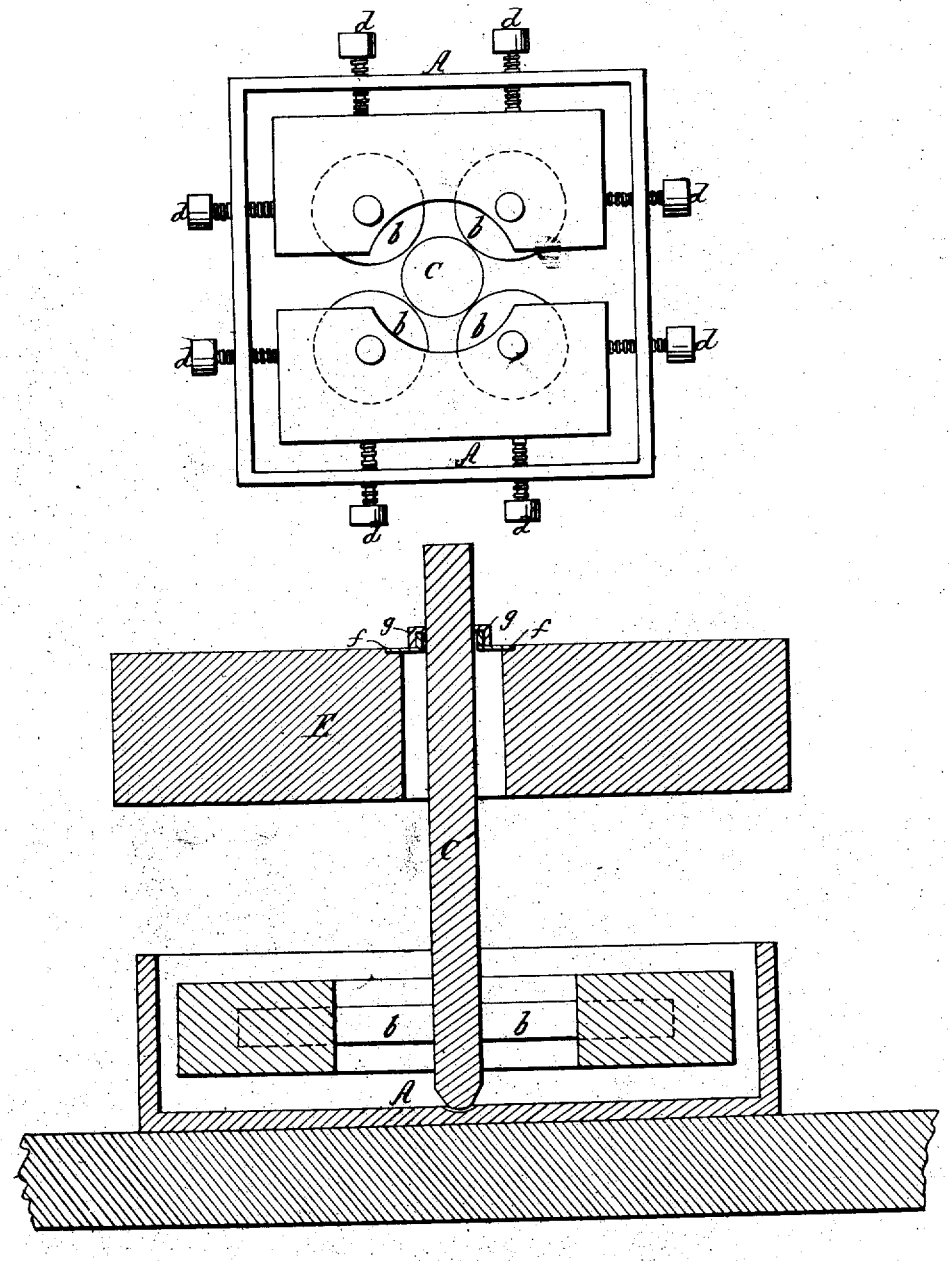

4 8060X 171.

March 10. 1834

Frederick Fredly of Logan Township Pennsylvania
Letters Patent

The Schedule referred to in these Letters Patent and making part of the same containing a description in the words of the said Frederick Fredley himself of his improvement being a mode of lessening the friction on mill Spindles, and keeping them perpendicular whilst running without being bushed entitled "Fredly's improved mill Spindles" -

Be it known that I Frederick Fredly of Logan Township Centre County, State of Pennsylvania have invented an improvement in the useful arts, being a mode of lessening the friction on Mill Spindles, and keeping them perpendicular whilst running, without the necessity of bushing, entitled "Fredly's improved mill Spindles" which is described.

The Spindle may be made in the common form, or in any other most convenient, except that there is a cylindrical projection on it turned true, and below the bed stone, against which the pulleys to be hereafter described turn.

There are three or more pulleys or rollers about 18 inches diameter turned true, and revolving on steel axles or cast metal supports in suitable oil cups. These embrace the Spindle closely at equal distances apart, and work against the abovementioned projection turned on the Spindle.

Upon the bed stone is laid an iron plate, having a flange turned upwards about 3/4 of an inch. over this flange or projection is placed a collar having a flange turning downwards of a greater diameter than the one turned upwards passing round the spindle and made fast to it and over the flange of the plate, turning freely round but so close as to prevent any grain from entering. Balls are placed in a cavity in the bottom of the Spindles or gudgeons to pre

8060X

-vent them wearing down. By the above arrangement the spin-
dle is kept upright and runs perfectly true. The collar & flange
prevent the grain passing through the opening in the bed,
which opening has heretofore been bushed but is now to be
left open around the spindle, covered by the before mention-
ed collar. — The Invention here claimed and desired
to be secured by Letters Patent consists in the use of three
or more pulleys or rollers placed round the spindle to
keep it upright, serving also as a bush and prevents
wear and friction to the spindle, also in the use of the
collar and flange on the plate to prevent the grain pas-
sing thro' the eye of the bed.

For a further illustration of my invention I refer
to the model and drawing of the same deposited in the Patent
Office. In testimony whereof I hereunto subscribe my
name this 19th day of February 1834.

Witnesses
E. Fairbanks
W. F. Elliott

Frederick Freddy

[illegible] JHJ (Exeminer)

(Patented 11 March 1834)

Drawing